United States Patent [19]

Veltman et al.

[11] Patent Number: 5,472,042

[45] Date of Patent: Dec. 5, 1995

[54] APPARATUS FOR MANAGING RETORT OVER-PRESSURE DURING PRESSURE COOLING

[75] Inventors: Joost Veltman, Santa Cruz; Richard W. Ripley, Coarsegold, both of Calif.

[73] Assignee: FMC Corporation, Chicago, Ill.

[21] Appl. No.: 227,413

[22] Filed: Apr. 13, 1994

Related U.S. Application Data

[62] Division of Ser. No. 880,628, May 8, 1992, Pat. No. 5,358,030.

[51] Int. Cl.$^6$ .............................. A61L 2/04; A61L 2/06; A23L 3/04; A23L 3/06
[52] U.S. Cl. .............................. 165/31; 99/468; 99/470; 99/483; 422/25; 422/27; 422/33; 422/112; 422/297; 422/302
[58] Field of Search ................ 165/31, 1, 2; 99/470, 99/468, 483; 426/407; 422/25, 27, 33, 112, 297, 302

[56] References Cited

U.S. PATENT DOCUMENTS

| | | | |
|---|---|---|---|
| 2,082,460 | 6/1937 | Omsted | 422/295 |
| 3,107,975 | 10/1963 | Linder | 422/295 |
| 3,239,200 | 3/1966 | Brown, Jr. | 422/208 |
| 3,366,442 | 1/1968 | Neiss | 422/25 |
| 4,294,804 | 10/1981 | Baran | 422/28 |
| 4,385,035 | 5/1983 | Akitoshi et al. | 99/483 |
| 4,397,814 | 8/1983 | Darecchio | 99/468 |
| 4,685,507 | 8/1987 | Schäfer | 165/61 |
| 4,874,580 | 10/1989 | Sugisawa et al. | 422/25 |
| 5,095,392 | 10/1991 | Wijts | 99/470 |
| 5,358,030 | 10/1994 | Veltman et al. | 165/2 |

FOREIGN PATENT DOCUMENTS

1438029  6/1976  United Kingdom.

OTHER PUBLICATIONS

Swientek, Robert J. "Computerized Control System Optimizes Retort Presses" Food Processing Oct. 1985.

Datta, A. K. "Computer–Based Retort Control Logic for On–Line Correction of Process Deviations" Journal of Food Sciences 51(2):480–483, 1986.

Dodrill, Robert K. "Retort Sterilization–Fact v. Myth" presented at 8th International Ryder Conference on Food Packaging Sep. 26–28, 1990 pp. 99–109.

*Primary Examiner*—John K. Ford
*Attorney, Agent, or Firm*—Michael Lee; D. W. Rudy

[57] ABSTRACT

The invention provides a method and apparatus for managing retort over-pressure during pressure cooling. The invention allows the specification of an initial cooling temperature and a final cooling temperature and a final cooling pressure. Using these values the invention provides a pressure ramping to manage retort over-pressure.

8 Claims, 4 Drawing Sheets

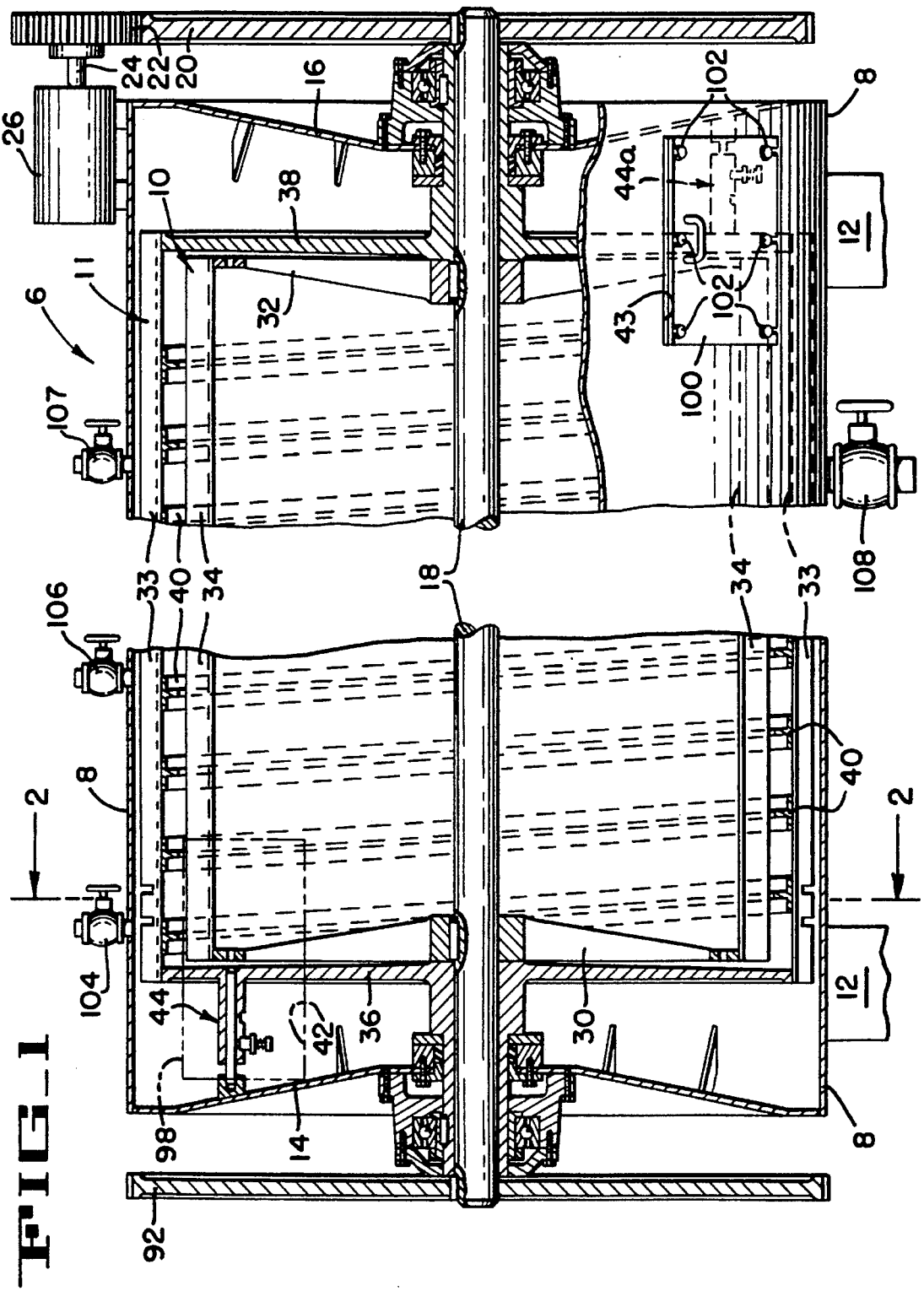
FIG_1

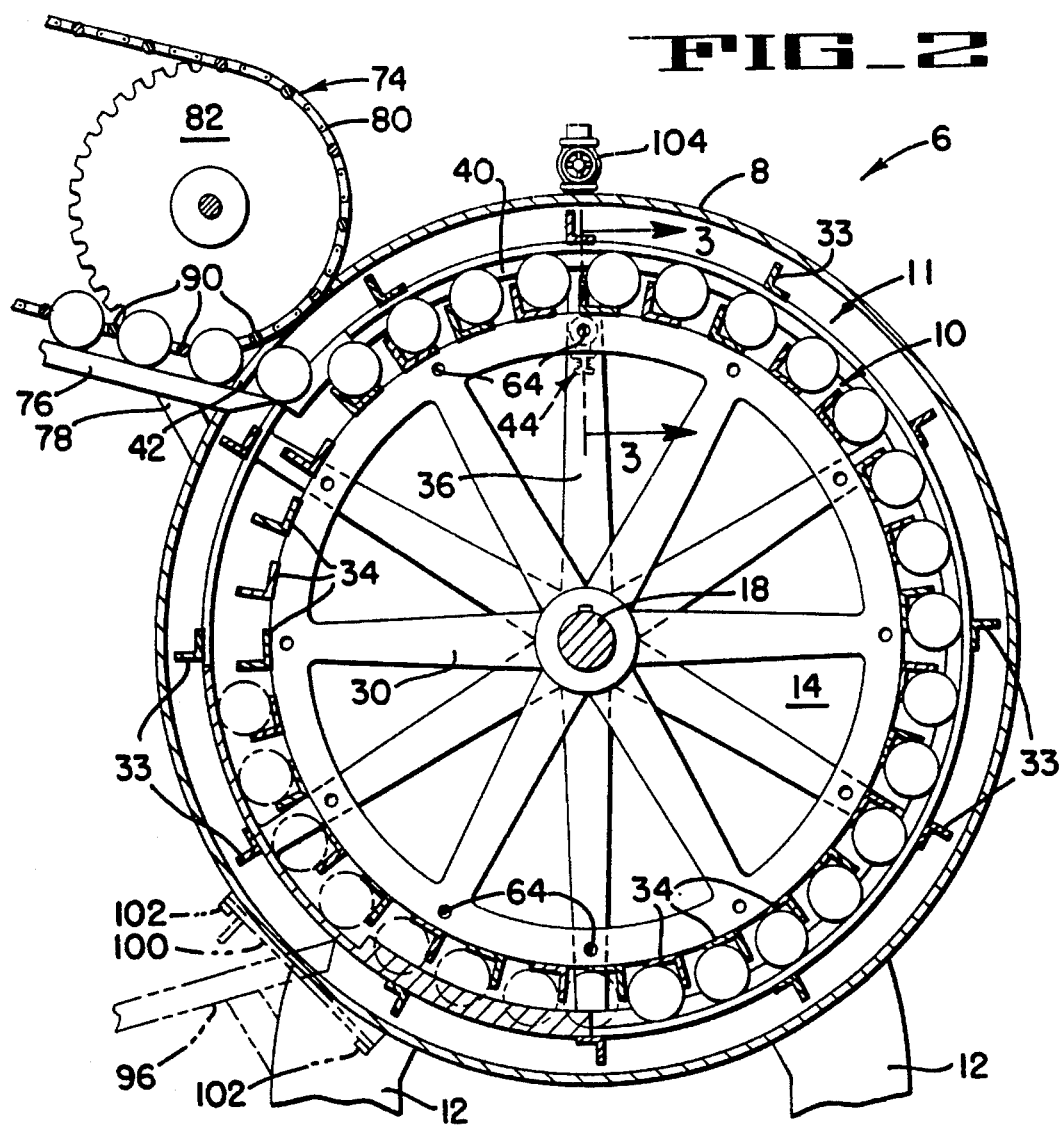
FIG_2
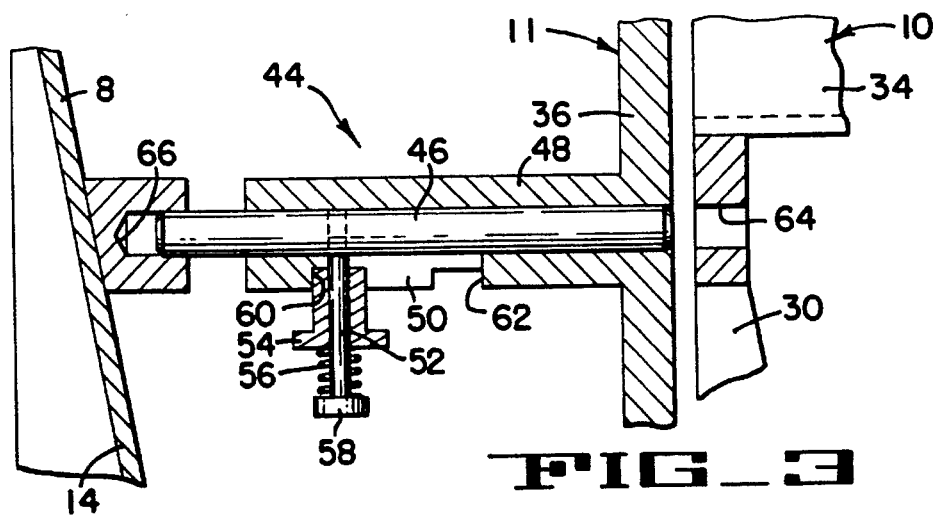
FIG_3

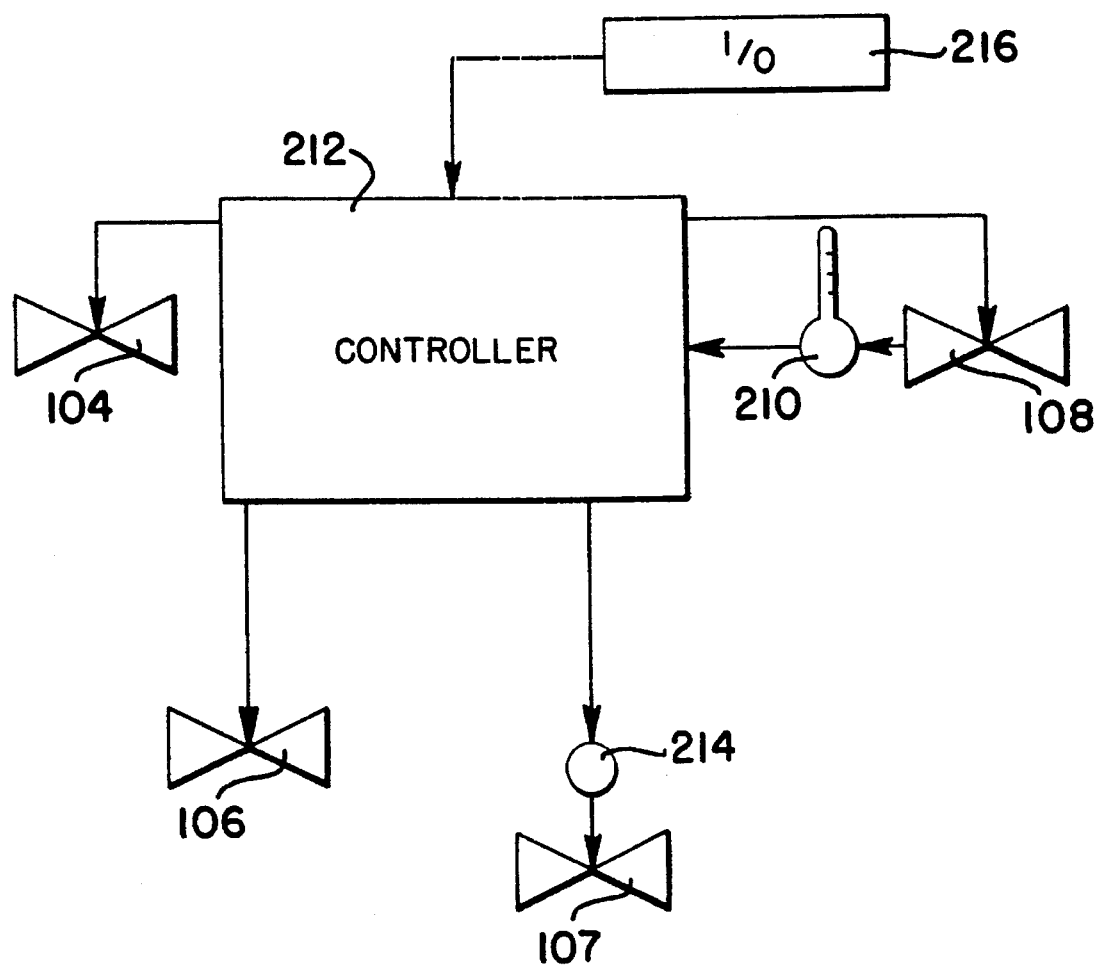
FIG_4

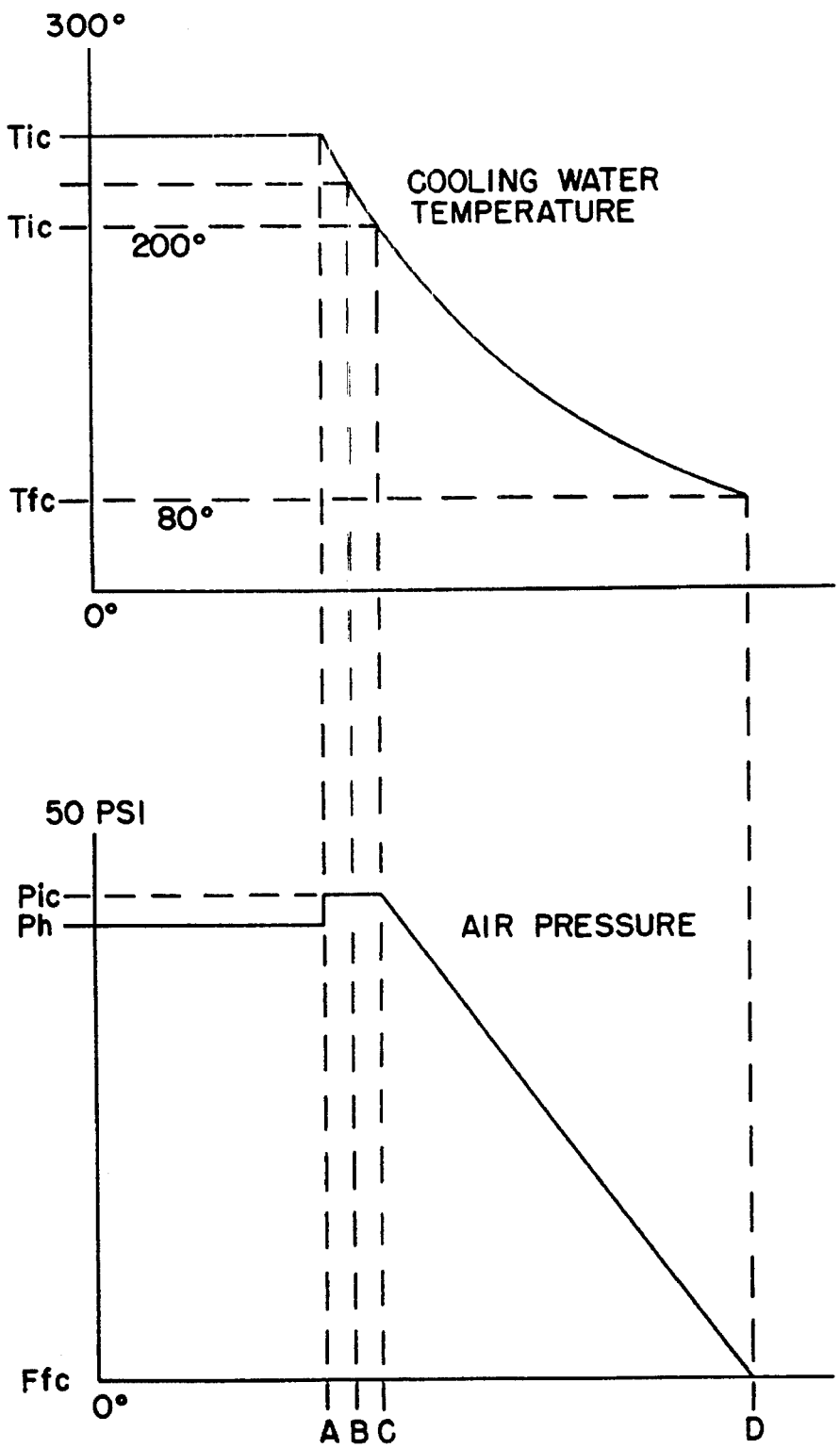

APPARATUS FOR MANAGING RETORT OVER-PRESSURE DURING PRESSURE COOLING

This is a division of application Ser. No. 07/880,628, filed May 8, 1992, now U.S. Pat. No. 5,358,030.

Batch type retorts for-in-container sterilization, frequently require pressure cooling to protect the container from deforming. After the sterilization process, where steam has been the heat source, over-pressure is established by adding a non-condensable gas, e.g., air into the retort. The required cooling over-pressure ramping becomes a critical control parameter of the process control cycle.

These batch retorts are equipped with many different automatic pressure ramping schemes. For fully automatic batch retort systems, where multiple compliments of food are being processed at different temperatures and/or pressures, the ramping parameters can become a complex control requirement. In batch retorts such as an orbitort typical recipe management for over-pressure ramping would place an additional burden on the process control authority.

The invention provides a ramping method and apparatus which provides a recipe dependent pressure ramping profile for each individual containerized product for batch retorts such as an orbitort or a rotating batch retort which uses baskets. The inventive ramping method and apparatus uses exclusively the cooling temperature parameters of the processing recipe to determine the required pressure ramping rate and speed. Recipe temperature values, selected for the processing, are used to determine the pressure profile during the cooling cycle.

FIGS. 1 is a side elevation of the cooking and cooling apparatus of an orbitort which uses the invention, certain parts being broken away and other parts being shown in central vertical section and in phantom.

FIG. 2 is a vertical section taken along lines 2—2 of FIG. 1 illustrating a fragment of a feed conveyor with the spiral of the apparatus being locked to the cooker housing.

FIG. 3 is an enlarged section taken along lines 3—3 of FIG. 2 illustrating the device for locking the spiral selectively to the housing or to the reel.

FIG. 4 is a schematic diagram of a controlling apparatus of the orbitort.

FIG. 5 is a graph plotting temperature verses time and a graph plotting pressure verses time.

The orbitort 6 is an apparatus for cooking and cooling cylindrical containers wherein containers are advanced on their sides or cylindrical surfaces into axially elongated pockets of a reel, the containers are then locked to the reel for rotation therewith, the reel is then driven at a speed which causes centrifugal force at the center of gravity of the contents of the can to lie within a range of approximately ½ to 1 ½ of the weight of the contents, and the containers are released from the reel and discharged from the apparatus after completion of the cooking and cooling cycles.

The orbitort 6 (FIGS. 1 and 2) in general comprises a cylindrical housing (or vessel) 8 having a reel 10 and spiral 11 mounted for rotation therein. The spiral 11 surrounds the reel 10, is locked to the housing 8 during feeding and discharging of containers therefrom, and is locked to the reel 10 for rotation therewith during cooking and cooling of the containers.

More particularly, the housing 8 is mounted in fixed position on legs 12 and has end plates 14 and 16 rigid therewith, which plates close the inlet end and outlet end of the housing, respectively. A reel drive shaft 18 is rotatably supported by the end plates 14 and 16 and extends concentrically through the housing 8. A large diameter drive gear 20 keyed to the shaft 18 is driven by a pinion 22 keyed to the drive shaft 24 of a variable speed motor 26 that is mounted on the housing 8.

The reel 10 comprises a pair of wheels 30 and 32 keyed to the shaft 18 adjacent the end plates 14 and 16, respectively, and include annular peripheral surfaces to which a plurality of evenly spaced container supporting angle bars 34 are secured. As indicated in FIG. 2, the angle bars 34 are spaced a sufficient distance apart to accommodate the particular size container being processed in such a way that each container may be slidably moved in its angle bar from one end of the housing to the other. As seen in FIG. 2, the bars 34 prevent the sides of adjacent cans from rubbing together but are spaced sufficiently to permit limited circumferential shifting of the containers.

The spiral 11 is provided in order to confine each container in its supporting angle bar, and during the loading and unloading operation to effect movement of each container axially of the housing along the associated supporting bars. The spiral 11 comprises spiral supporting wheels 36 and 38 rotatably supported by the end plates 14 and 16 and by the reel drive shaft 18 adjacent opposite ends thereof and being slightly large in diameter than the wheels 30 and 32. A plurality of axially extending support bars 33 are secured to the outer periphery of the wheels 36 and 38 and have a generally helical spiral track 40 of T-shaped cross section rigidly secured thereto and extending the full length of the reel from a container inlet opening 42 to a container discharge opening 43. It will be understood that containers are supported on their sides and that the axial spacing between each adjacent winding of the track is slightly greater than the length of the containers being handled so as to accommodate and slidably engage the containers and guide them from one end of the cooking and cooling apparatus 6 to the other during loading and unloading.

As mentioned previously, the spiral 11 is locked to the housing 8 only during loading and unloading of the cooking apparatus 6 with containers, thereby permitting relative movement between the spiral 11 and containers at this time. The spiral is locked to the reel 10 during processing thereby preventing relative movement between the reel, spiral 11 and containers for confining the containers between the reel and spiral.

In order to lock the spiral to either the housing 8 or the reel 10, locking devices 44 and 44a are provided adjacent the ends of the housing 8. Since both locking devices are identical only the device 44 near the inlet end will be described in detail.

The locking device 44 (FIG. 3) comprises a slidable rod 46 which is slidably received in a hub 48 formed on the spiral supporting wheel 36. The hub 48 is slotted at 50 to accommodate an actuating pin 52 secured to and projecting outwardly from the rod 46 through the slot. A flanged locking knob 54 is slidably received on the pin 52 and is urged toward the hub 48 by a spring 56 disposed between the knob 54 and an enlarged head 58 of the pin. The hub is provided with counterbores 60 and 62 which selectively receive the knob 54 and are effective for locking the rod 46, and accordingly the spiral 11, to the reel 10 or to the housing 8, respectively. When locked to the reel, one end of the rod 46 extends through a hole 64 in reel supporting wheel 30; and when locked to the housing 8, the other end of the rod extends through a hole 66 in the end plate 14.

When it is desired to lock the spiral 11 to the housing 8, the machine is driven by the drive motor 26 until the rods 46 of each locking device become aligned with their associated holes 66 in the associated housing end plate 14 or 16, and then unlatches each knob 54 from the bores 62 and slides the ends of the rods into the holes 66 which withdraws the other end of the rod from the hole 64 in the reel 10. Thereafter, the locking device is released allowing it to become sealed in the associated bore 60. When it is desired to lock the reel 10 to the spiral 11 and unlock the spiral from the housing 8, the reel is first driven by the motor 26 until one of the holes 64 is aligned with the rod 46 of each device 44 and 44*a*. The rod is then engaged with the hole 64 and disengaged from the hole 66 by reversing the above described latching procedure.

In order to direct cans into and out of the cooking and cooling apparatus 6 and to provide access to the locking devices 44 and 44*a*, the inlet opening or port 42 and the discharge opening or port 43 are provided near opposite ends of the housing 8. Containers are fed into the inlet port 42 by any suitable means such as by a free roller feed conveyor 74 and cooperating container supporting chute 76. The conveyor 74 and chute 76 are supported by a frame 78 that is secured to the housing 8.

The feed conveyor 74 comprises a pair of parallel endless chains 80 (only one being shown) each trained around planar aligned pairs of sprockets 82 (only one being shown) journalled in the frame 78. A plurality of equally spaced rollers 90 are journalled on and extend transversely between the two chains and serve to accommodate one container between each adjacent pair of rollers 90. The conveyor 74 is driven in timed relation with the reel 10 by a gear 92 (FIG. 1) that is secured to the reel shaft 18.

An inclined discharge chute 96 is secured to the housing 8 adjacent the discharge port 43 to allow containers discharged from the apparatus 6 to roll free of the apparatus.

After the cooking and cooling apparatus 6 has been filled with a batch of containers, it being understood that each batch includes slightly less than the total number of containers that can be fitted into the cooker so that each container will be positively confined from movement relative to the reel 10 and spiral 11 during the cooking process, the motor 26 is temporarily stopped and the spiral 11 is unlatched from the housing 8 and is locked to the reel 10 to rotate therewith. The inlet port 42 and discharge port 43 are then sealed in fluid tight engagement by gates of any suitable type such as gates 98 and 100, respectively, which are connected to the housing by bolts 102, only the gage 100 being shown in detail. It will, of course, be understood that the feed chute 76 and discharge chute 96 will be withdrawn from the ports 42 and 43 when the gates 98 and 100 are bolted in place.

A steam inlet conduit valve 104, a cooling water inlet conduit valve 106, a high pressure air conduit valve 107, and a drain conduit valve 108 are connected to the housing 8 for selectively directing high pressure heating and cooling mediums into the housing and for selectively draining the heat treatment mediums from the housing. A control apparatus is schematically illustrated in FIG. 4. A controller 212, which could be a general purpose or specialized computer or computer chip, controls the steam inlet conduit valve 104, the cooling water inlet conduit valve 106, and the drain conduit valve 108. The temperature of fluid flowing through the drain conduit valve 108 is measured by a temperature transmitter 210, which provides input into the controller 212. The controller also controls a pressure regulator 214, which controls the high pressure air conduit valve 107. A final cooling pressure $P_{fc}$, which could be an absolute number or set in relation to the barometric pressure such as 1 psi above the barometric pressure, is a value previously set in the controller 212 or according to the characteristics of the machine.

In the operation of the cooking and cooling apparatus, the operator uses the input/output device 216 to set the controller 212 a cooking recipe specifying an initial cooling temperature $T_{ic}$ and a final cooling temperature $T_{fc}$. The gates 98 and 100 are removed from the inlet and the discharge ports 42 and 43, respectively, and the spiral 11 is locked to the housing 8. The motor 26, which may be a variable speed motor, is then started and a batch of containers, such as No. 10, or gallon cans, are advanced by the feed conveyor 74 through the inlet port 42 and into registering engagement with the reel and spiral which advances the containers spirally through the cooking and cooling apparatus at a relatively low speed until the batch is completely loaded into the apparatus. The motor 26 is then stopped and the spiral 11 is unlocked from the housing 8 and locked to the reel 10 by the locking devices 44 and 44*a*. The gates 98 and 100 are then secured in pressure tight relationship to the inlet port 42 and discharge port 43 respectively, thereby sealing the ports and preparing the cooking and cooling apparatus 6 for its cooking cycle.

With the water inlet conduit valve 106 and drain conduit valve 108 closed, a heating medium under pressure, as such as steam or a steam-air mixture is directed through the valves 104 and/or 107 and into the housing 8. The reel 10, with the spiral 11 locked thereto so that the containers are positively confined therein and do not move relative to either the reel or spiral, so as to maintain the charge pattern is then driven at a speed in excess of about 24 revolutions per minute when the radius of the reel is about four feet. The high speed rotation of the reel causes the contents of each container to circulate past the surfaces of the containers and then through the centers thereof thereby greatly improving the heat transfer characteristics. After the contents of the containers sufficiently cooked at the desired temperature a cooling process begins.

At the beginning of the cooling process which is shown as time A in FIG. 5, the steam inlet conduit valve 104 is closed by the controller 212. The controller 212 sets the pressure regulator 214 to a pressure above the heating pressure $P_h$ in the vessel 8. This higher pressure is the initial cooling pressure $P_{ic}$. In the preferred embodiment, the controller 212 sets the pressure regulator 214 to a pressure of 0–5 psi above the heating pressure $P_h$ in the vessel 8, such that $0<P_{ic}-P_h<5$. The pressure regulator 214 allows the high pressure air conduit valve 107 to provide high pressure air to the vessel 8 to provide a pressure equal to the initial cooling pressure $P_{ic}$.

Next during the micro-cool time period between times A and B in FIG. 5, the controller 212 partially opens the cooling water inlet conduit valve 106, which allows a flow of a small amount of cooling fluid, which in this embodiment is water, into the housing 8. During this time period, the controller 212 maintains the pressure at approximately $P_{ic}$. The temperature transmitter 210 measures the temperature $T_p$ of the fluid flowing through the drain conduit valve 108 and sends the measured value $T_p$ to the controller 212.

After a short period of time (0–60 seconds) the micro-cool time period ends and the macro-cooling time period begins shown as time B in FIG. 5. At time B, the controller 212 causes the cooling water inlet conduit valve 106 to open more so that a greater amount of cooling fluid flows into the housing 8. The temperature transmitter 210 continues to measure the temperature $T_p$ of the fluid flowing through the drain conduit valve 108 and send the measured value $T_p$ to the controller 212. Once reaching temperature $T_{ic}$ in FIG. 5, as measured at valve 108, the pressure regulator 214 will begin to ramp the pressure down, indicated at time C. During this macro-cool the controller 212 sets the pressure regulator 214 to maintain a pressure $P_v$, which varies according to temperature, and where:

$$P_v=P_{fc}+[(T_p-T_{fc})/(T_{ic}-T_{fc})]-(P_{ic}\times P_{fc}).$$

Once the measured temperature $T_p$ is equal to or less than the final cooling temperature $T_{fc}$ at time C, the macro-cooling time period is complete. The water inlet conduit valve 106 and the high pressure air conduit valve 107 are closed.

During the micro-cool and macro-cool time periods, the reel 10, spiral 11, and containers continue to rotate at the same rapid speed until the temperature of the containers has been reduced sufficiently to permit the containers to be released to the atmosphere without danger of damage to the containers due to an excessive pressure differential occurring between the internal and external surfaces of the containers.

After the micro-cool and macro-cool time periods, the motor 26 is then stopped and the gates 98 and 100 are removed from the inlet port 42 and discharge port 43, respectively. The motor is then jogged until the slide rod 46 of each locking device 44 and 44a is aligned with the associated hole 66 in the end plates of the housing 8 to unlock the spiral 11 from the reel 10 and lock the spiral 11 to the housing 8.

The motor 26 is then started, driving the reel 10 relative to the stationary spiral 11 at a suitable speed depending upon the size of the cans thereby causing the processed containers to be driven spirally through the cooking and cooling apparatus and out the discharge port 43 for removal therefrom by the inclined chute 96. The cycle of operation is then repeated for the next batch of containers.

The inventive pressure ramp profile is completely dependent on the two temperature set points chosen in the recipe and a final pressure. Hence, the pressure ramp will follow along the actual temperature ramp; beginning to ramp (pressure) at $T_{ic}$, and ending the ramp (at $P_{fc}$) precisely at the $T_{fc}$.

Pressure may, in fact, rise to accommodate any intermittent increases in the cooling water temperature, i.e., losses in water supply pressure. Therefore, the pressure ramp rate can now be easily affected by modifying Tic or $T_{fc}$; with assurance that the over-pressure will follow the real temperature ramp profile automatically.

The simplicity of this approach gives the retort operator an easy operation tool to effect retort cooling pressure without the need to understand all details of retort pressure management. It further provides the flexibility needed for retorts processing great numbers of different product recipe's.

Examples of values which may be used in the invention, $T_{ic}$=200° F., $T_{fc}$=100° F., $P_{fc}$=barometric pressure, and $P_{ic}$-$P_h$=2 psi. A suggested range for the initial cooling temperature Tic is between 212° F. and $T_{fc}$. A suggested range for the final cooling temperature $T_{fc}$ is between 160° F. and 32° F. A suggested range for the final cooling pressure $P_{fc}$ is between −5 psi and 5 psi gauge pressure. $P_{fc}$ may be set according to actual barometric pressure. A suggested range for $P_{ic}$-$P_h$ is between −1 psi and 5 psi.

Although the preferred embodiment utilizes an orbitort, the invention may be practiced in other batch retorts such as a batch retort which rotates cans in a basket or on trays.

Other ramping schemes are possible, wherein the pressure $P_v$ is a function of the final pressure $P_{fc}$ added to a proportional factor which is a function of the present temperature $T_p$ the initial cooling temperature $T_{ic}$, the final cooling pressure $T_{fc}$, and the initial cooling pressure $P_{ic}$. More preferably, $P_v=P_{fc}+F(T_p,T_{fc},T_{ic})\times(P_{ic}-P_{fc})$ when the temperature $T_p$ of the coolant drained from the vessel is less than or equal to the initial cooling temperature $T_{ic}$ and wherein $F(T_p,T_{fc},T_{ic})$ is a function of $T_p$, $T_{fc}$, and $T_{ic}$ and wherein if $T_{fc} \leq T_p \leq T_{ic}$ then $0 \leq F(T_p,T_{fc},T_{ic}) \leq 1$. More preferably $F(T_{ic},T_{fc},T_{ic})=1$ and $F(T_{fc},T_{fc},T_{ic})=0$. An example of such a relationship is $P_v=P_{fc}+[(T_p-T_{fc})/(T_{ic}-T_{fc})]^2\times(P_{ic}-P_{fc})$.

While preferred embodiment of the present invention has been shown and described herein, it will be appreciated that various changes and modifications may be made therein without departing from the spirit of the invention as defined by the scope of the appended claims.

What is claimed is:

1. An apparatus for pressurizing during cool down an interior of a batch retort vessel, which has heated by steam to a heating temperature and a heating pressure and has been pressurized to an initial cooling pressure $P_{ic}$ and with a final cooling pressure $P_{fc}$, comprising:

means for setting an initial cooling temperature $T_{ic}$ and a final cooling temperature $T_{fc}$;

means for providing a non-condensable gas to the interior of the vessel to provide pressure to the vessel;

means for introducing a flow of coolant into the vessel;

means for draining the coolant from the vessel;

means for measuring the temperature $T_p$ of the coolant drained from the vessel; and means for regulating the pressure in the vessel $P_v$, so that $P_v=P_{fc}+F(T_p,T_{fc},T_{ic})\times(P_{ic}-P_{fc})$ when the temperature $T_p$ of the coolant drained from the vessel is less than or equal to the initial cooling temperature $T_{ic}$ wherein $F(T_p,T_{fc},T_{ic})$ is a function of $T_p$, $T_{fc}$, and $T_{ic}$ and wherein $F(T_p,T_{fc},T_{ic})=[(T_p-T_{fc})/(T_{ic}-T_{fc})]^2$.

2. An apparatus, as claimed in claim 1, wherein the final cooling pressure is approximately equal to the barometric pressure.

3. An apparatus, as claimed in claim 1, wherein the coolant is water.

4. An apparatus, as claimed in claim 1, wherein the initial cooling temperature is between 212° F. and 160° F.

5. An apparatus, as claimed in claim 4, wherein the final cooling temperature is between 160° F. and 32° F.

6. An apparatus, as claimed in claim 5, wherein the final cooling pressure $P_{fc}$ is between −5 psi and 5 psi gauge pressure.

7. An apparatus, as claimed in claim 5, wherein the final cooling pressure $P_{fc}$ is approximately equal to the barometric pressure.

8. An apparatus for pressurizing during cool down an interior of a batch retort vessel, which has heated by steam to a heating temperature and a heating pressure and has been pressurized to an initial cooling pressure $P_{ic}$, and with a final cooling pressure $P_{fc}$, comprising:

means for setting an initial cooling temperature $Ti_c$ and a final cooling temperature $T_{fc}$;

means for providing a non-condensable gas to the interior of the vessel to provide pressure to the vessel;

means for introducing a flow of coolant into the vessel;

means for draining the coolant from the vessel;

means for measuring the temperature $T_p$ of the coolant drained from the vessel; and means for regulating the pressure in the vessel $P_v$, so that $P_v = P_{fc} + F(T_p, T_{fc}, T_{ic}) \times (P_{ic} - P_{fc})$ when the temperature $T_p$ of coolant drained from the vessel is less than or equal to the initial cooling temperature $T_{ic}$ and wherein $F(T_p, T_{fc}, T_{ic})$ is a function of $T_p$, $T_{fc}$, and $T_{ic}$ and wherein $F(T_p, T_{fc}, T_{ic}) = [(T_p - T_{fc})/(T_{ic} - T_{fc})]^2$.

* * * * *